March 7, 1967

C. D. HOPPES 3,308,223

METHOD OF MAKING MOLDS FOR ELASTOMERIC
ARTICLES HAVING SURFACE DETAILS
Filed Nov. 18, 1963

INVENTOR.
CARLOS D. HOPPES
BY William C. Cleland
Attorney

United States Patent Office 3,308,223
Patented Mar. 7, 1967

3,308,223
METHOD OF MAKING MOLDS FOR ELASTOMERIC ARTICLES HAVING SURFACE DETAILS
Carlos D. Hoppes, Ashland, Ohio, assignor to The National Latex Products Company, Ashland, Ohio, a corporation of Ohio
Filed Nov. 18, 1963, Ser. No. 324,582
9 Claims. (Cl. 264—220)

This invention relates to a method of making molds, and in particular relates to a method of making molds for vulcanizing elastomeric articles having surface details or design configurations.

Heretofore, molds for making foam rubber balls with surface designs simulating the stitching or regulation baseballs, for example, have been laboriously hand-engraved from steel blanks, or cast from aluminum by precision methods. These methods were very costly, and although aluminum molds were less costly to make than hand-engraved molds, they were likely to contain porosity which produced surface defects on articles molded in the same.

One object of the present invention is to provide an improved method of making a sectional cavity mold for a fraction of the cost of making either hand-engraved or steel molds.

Another object of the invention is to provide a method of making a sectional cavity mold having accurately reproduced cavity surface designs, and by which the cavity surfaces will be free of porosity likely to produce defects on articles formed in the mold.

Another object of the invention is to provide a method of making a mold, having the aforesaid desirable surface characteristics, while the mold sections generally may be of relatively inexpensive material, such as ordinary sand-cast aluminum or steel.

These and other objects of the invention will be manifest from the following brief description and the accompanying drawings.

Of the accompanying drawings:
FIGURE 1 is a vertical cross-section of a dipping tank, and illustrating use of the same for an initial process step of dipping therein an existing article, or preformed model thereof, to form a spherical shell.

Figure 1:
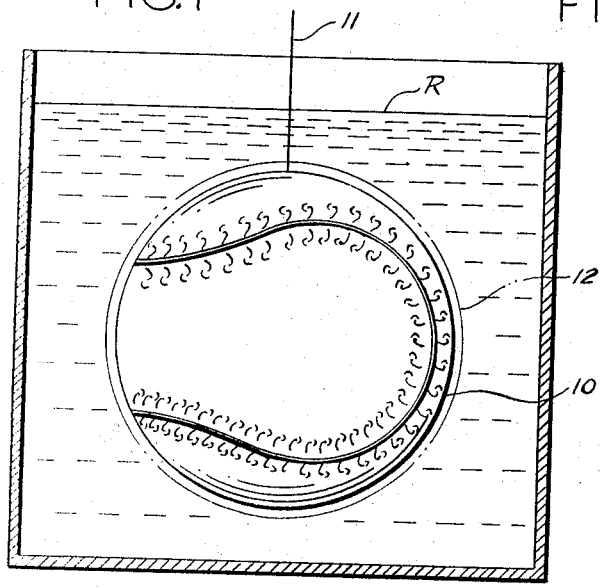

Referring to FIGURE 1, there is illustrated a model 10 of an article from which, as an example, a sectional cavity mold may be inexpensively made by the method of the present invention. The model of pattern 10 is represented as a playball having outer markings or three-dimensional configurations in the nature of the well known stitching of a regulation baseball. The baseball for which the production mold is desired, however, is of the type used by children and made of solid natural or synthetic sponge rubber, and having a white colored skin coating of rubber thereon. While the model 10 may be carved, sculptured, or otherwise made from suitable hard materials, the method to be described contemplates use of an actual molded, sponge rubber baseball.

In accordance with the method herein, the model 10, namely a solid sponge rubber ball, is suspended, as by means of a fine wire 11, and dipped in a solution R of high-temperature resistant, acrylic rubber. A synthetic rubber found highly satisfactory for this purpose is "Hycar" 4021 type PA-21, a trademarked product of B. F. Goodrich, Akron, Ohio. Prior to dissolving the acrylic rubber it may be mixed with vulcanizing agents such as Trimene Base, triethylene tetramine or similar amines. A solvent, such as toluol, may be used in suitable proportion to yield a readily flowable mixture. The ball model 10 may be dipped one or more times, as necessary, to build up the rubber deposit as a shell 12, indicated in chain-dotted lines in FIGURE 1, of requisite thickness, such as from $\frac{1}{32}''$ to $\frac{1}{8}''$.

The shell 12, which becomes a negative pattern for the ball model 10, is now dried to remove any solvent appearing on the outer surfaces, and then the shell, still on the ball model, is exposed to open heat of vulcanization, such as within a steam autoclave, to vulcanize the acrylic rubber. In practice, a satisfactory degree of cure was accomplished with steam pressure at 80 p.s.i. The curing time depends on a number of factors, such as the thermal conductivity and specific heat coefficient of the model. While the curing time could be as much as one hour, a satisfactory cure has been accomplished in as little as three minutes.

Figure 2:
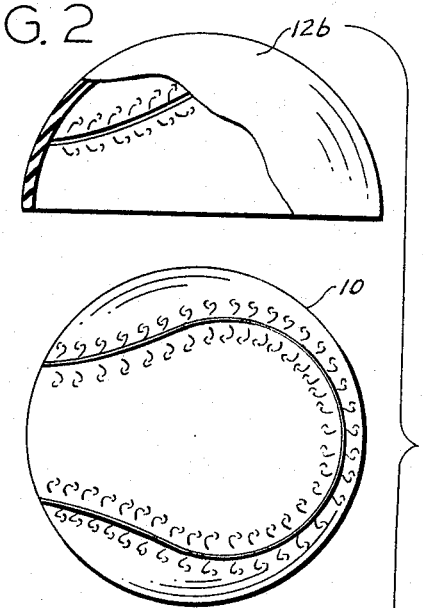
FIGURE 2 is an exploded view of the model and a hardened spherical shell made thereon, the shell having been cut to form two hemispheres constituting negative patterns of the desired article.

Upon removal of the shell and ball model from the heat of vulcanization, the shell is cut with a sharp blade to remove the same from the ball model as two hemispherical sections 12a and 12b, as illustrated in FIGURE 2.

Figure 3:
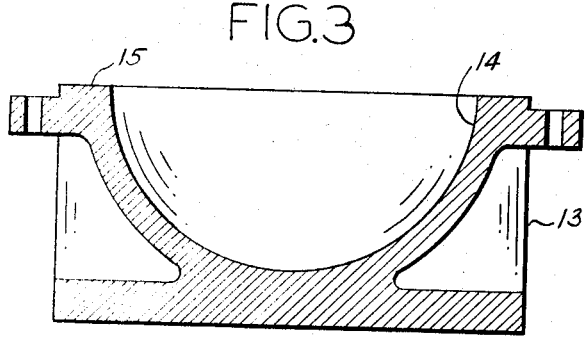
FIGURE 3 is a vertical cross-section through a preformed or prefabricated backing portion for a lower mold section, the same having a hemispherical cavity therein.

Upper and lower metal cavity mold sections, or other suitable mating mold members are now provided on the lower mold member 13, as best shown in FIGURE 3. Both mold members 13 may be provided with oversized hemispherical recesses 14 of slightly greater diameter than the outer diameter of shell 12, for purposes to be described later. The present method makes it possible to use upper and lower mold sections 13 which are either scrap molds or rough castings, modified if necessary, to provide the oversized recesses 14.

Figure 4:
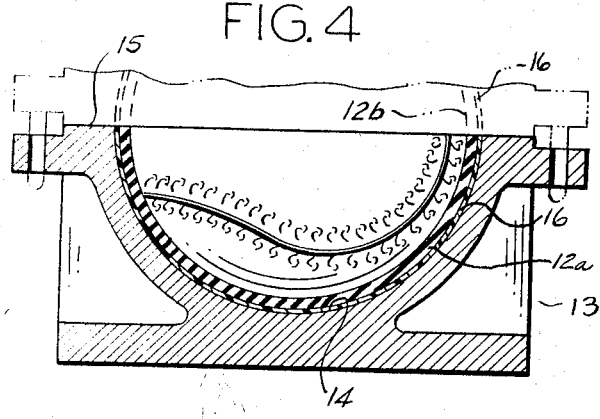
FIGURE 4 is a view corresponding to FIGURE 3, with a portion of the upper mold indicated in chain-dotted lines, and illustrating the backing portions with hemispherical shells affixed within the same.

The vulcanized hemispherical shell sections 12a and 12b are now each coated on the outer surfaces thereof with a substantial thickness of suitable high-temperature resistant, adhesive filler material, such as "Dow Corning No. 271" silicone adhesive. The filler 16, which is a liquid when applied, sets to a rubbery condition, and is capable of resisting temperatures in excess of 400° F. The coated sections are pressed into the respective backing member recesses 14, until the exposed edges of the shell sections are parallel or even with parting line surfaces 15 of the mold members, as illustrated in FIGURE 4. Hemispherical plungers (not shown) may be provided to fit complementally within the shell sections, and operated to apply clamping pressure thereto until the adhesive fillers 16 set and harden.

Figure 5:
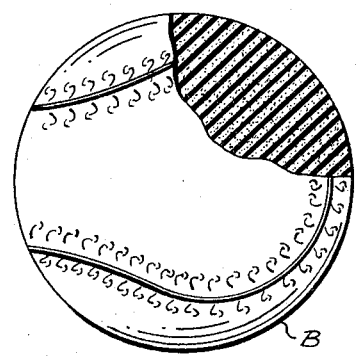
FIGURE 5 is a view, partly broken away and in section, of an article made in the mold of FIGURE 4, and accordingly, having the same surface markings or configurations.

Molds inexpensively made by the above described method have been used in known manner to produce solid sponge rubber balls B, as shown in FIGURE 5. The mold shell halves 12a and 12b, made from Hycar rubber, are capable of withstanding article vulcanizing temperatures up to approximately 400° F., whereas temperatures under 300° F. are adequate for curing sponge rubber balls, for example. The inserted shell halves have rubber-like resiliency, but are sufficiently stiff to resist normal molding pressures without deformation of the surface details.

The model 10, used for making the shells 12a and 12b may be preformed or made of any material not susceptible to attack by the toluene-acrylic rubber solution described above, as for example, wood, clay and certain waxes. Such materials are easy to shape with intricately carved or engraved surface detail.

In the above described procedure of dipping the mold 10 to form the spherical shell 12, silicone rubber may be substituted for acrylic rubber in the solution R with satisfactory results. Other modifications of the invention may be resorted to without departing from the spirit of the invention or the scope of the appended claims.

What is claimed is:

1. A method of making a cavity mold, comprising the steps of forming on a model article, having three-dimensional markings thereon, a hollow elastomeric shell of such firm, rubber-like resiliency as will resist molding pressures without substantial deformation of surface details to be formed by said markings; removing the formed shell as complemental segments thereof from the model article with negative impressions of said markings on the inner surface portions of the shell segments; affixing the shell segments in recesses of mating sections of a sectional cavity mold by means of a filler of high-heat resistant adhesive material disposed intermediate the shell segments and the respective said mating mold sections.

2. A method as in claim 1, said formed shell being of vulcanizable synthetic rubber and the method including vulcanizing the shell before removal from the model article.

3. A method as in claim 2, said adhesive layer being of silicone adhesive.

4. A method as in claim 3, said synthetic rubber of the shell being acrylic rubber.

5. A method as in claim 1, said synthetic rubber of the shell being acrylic rubber.

6. A method of making a sectional cavity mold comprising the steps of dipping a ball or like article, having three-dimensional markings on the exposed surface portions thereof, in a bath of high-heat resistant vulcanizable synthetic elastomer to form a hollow shell about the model article having predetermined shape and surface characteristics; exposing the article to heat of vulcanization of the elastomer to cure the same to have at least such firm rubber-like resiliency as to resist molding pressures substantially without deformation of surface details formed by said markings; cutting the cured shell in complemental sections and removing the same from the model article, the inner surfaces of the sections thereby having corresponding negative shape and surface characteristics of the article; and affixing complemental shell sections in recesses of corresponding mold backing sections, to be in substantial mating relationship with the respective recesses, with a filler of high-heat resistant adhesive material disposed intermediate the shell sections and the backing sections to affix the shell sections thereto.

7. A method as in claim 6, said filler being silicone adhesive.

8. A method as in claim 7, said synthetic rubber of the shell being acrylic rubber.

9. A method as in claim 6, said vulcanizable synthetic elastomer being acrylic rubber mixed with a solvent thereof and vulcanizing agents of the class including Trimene Base and Triethylene tetramine.

References Cited by the Examiner

UNITED STATES PATENTS

| | | | |
|---|---|---|---|
| 2,388,776 | 11/1945 | Wallace | 264—225 |
| 2,525,272 | 10/1950 | Rhoton | 264—338 |
| 2,660,762 | 12/1953 | Rosenberg | 264—163 |
| 2,662,248 | 12/1953 | Ames | 264—219 |
| 2,708,773 | 5/1955 | Bacon | 264—219 |
| 2,890,486 | 6/1959 | Crandon | 249—134 |
| 3,022,196 | 2/1962 | Jenkins et al. | 156—329 |
| 3,059,279 | 12/1962 | Rossi | 249—134 |
| 3,200,031 | 8/1965 | Rittenhouse | 161—307 |

ALEXANDER H. BRODMERKEL, Primary Examiner.

D. J. ARNOLD, Examiner.

B. SNYDER, Assistant Examiner.